(No Model.)

W. A. SPALDING.
BOX FOR TOOTH POWDER.

No. 512,065.   Patented Jan. 2, 1894.

Witnesses
J. H. Shumway
Lillian D. Kelsey

Warren A. Spalding, Inventor.
By Attys
Earle & Seymour

UNITED STATES PATENT OFFICE.

WARREN A. SPALDING, OF NEW HAVEN, CONNECTICUT.

BOX FOR TOOTH-POWDER.

SPECIFICATION forming part of Letters Patent No. 512,065, dated January 2, 1894.

Application filed July 24, 1893. Serial No. 481,265. (No model.)

*To all whom it may concern:*

Be it known that I, WARREN A. SPALDING, of New Haven, in the county of New Haven and State of Connecticut, have invented a new Improvement in Boxes for Tooth-Powders; and I do hereby declare the following, when taken in connection with accompanying drawings and the letters of reference marked thereon, to be a full, clear, and exact description of the same, and which said drawings constitute part of this specification, and represent, in—

Figure 1:
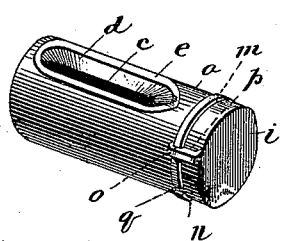
Figure 2:
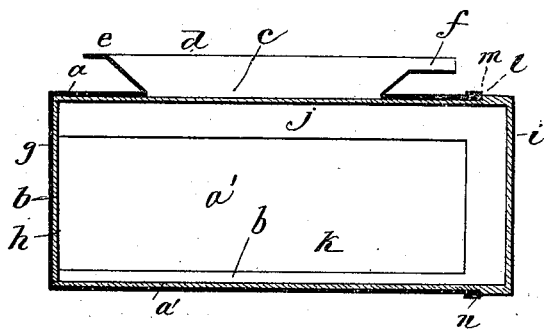
Figure 3:
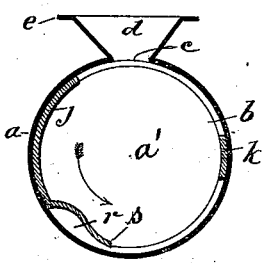
Figure 4:
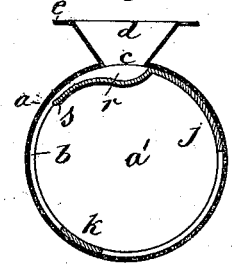
Figure 5:
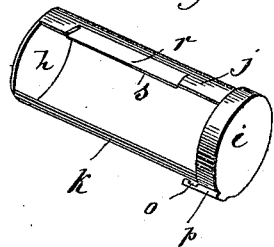
Figure 6:
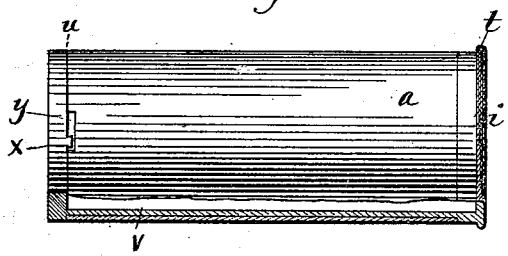
Figure 7:
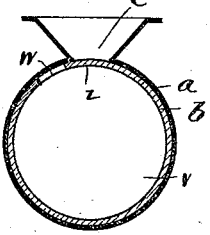
Figure 8:
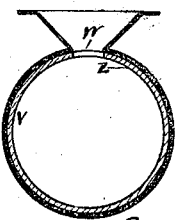

Figure 1, a perspective view of my improved box for tooth-powder; Fig. 2, a longitudinal section thereof enlarged; Figs. 3 and 4 views in cross-section showing the inside member in different positions; Fig. 5, a perspective view of the inner member; Fig. 6, an under side view of a modified form of box, partly in section; Figs. 7 and 8, views in cross-section, showing the inner member of the modified form of box, in different positions.

My invention relates to improvements in boxes for holding tooth-powder, its object being to produce a compact, cheap and convenient box from which the powder may be used without wasting, in a cleanly manner, and without injury to the bulk of powder contained therein.

With these ends in view my invention consists in a box constructed with an outer member provided with a funnel-shaped fender or guide and having an elongated mouth, and an internal gate or cut-off located within the said outer member and movable therein to open and close the mouth thereof.

The invention further consists in a box constructed with an outer member having a projecting funnel-shaped fender or guide, with which communicates a mouth formed in the said member, and an internal gate or cut-off located within the said outer member and having a measuring-pocket.

The invention further consists in other novel features to be hereinafter described and then particularly pointed out in the claims.

The preferred form of my invention, as illustrated in Figs. 1 to 5 inclusive, comprises two members, an outer one $a$, and an inner one $b$. The outer member $a$ is formed with an elongated opening $c$, which constitutes a delivery mouth, and which is located at the base of a fender or guide $d$. This fender or guide $d$ contracts toward its base, and is of elongated funnel-shape, having around its edge a flange $e$, and at one end a depression or concavity $f$ to provide a clearance space for the handle of a tooth-brush, the bristles of which are guided down the inclined inner sides of the fender or guide, so as to be contracted and consolidated at the opening or mouth $c$, to receive the powder without danger of waste by any scattering thereof that might otherwise occur.

In the drawings, the outer member $a$ is shown in cylindrical form, but I do not confine myself strictly thereto, as one with a square, hexagonal or other contour may be utilized. The end $g$ of the outer member $a$ is closed, but its opposite end is open to receive the inner member $b$, which fits snugly within, and conforms to the contour of the cylindrical chamber $a'$ of member $a$, so that it may be rotated without wabbling and will be held therein by friction against the wall of said chamber. At the inner end of the member $b$, is a disk $h$, connected with the circular head $i$ at the opposite end, by means of transversely curved wide and narrow strips $j$ and $k$, respectively. Wide strip $j$ forms a gate or cut-off to the mouth $c$, where it registers with and closes it, while narrow strip $k$ is simply a medium for securing strength and bracing the ends $h$ and $i$. The head $i$ is of larger diameter than the chamber of member $a$, so that the shoulder $l$ thereof will bear upon the edge $m$ of said member in the act of rotating the inner member. Surrounding the outer member $a$, contiguous to its edge $m$, is an annular bead $n$, which is received by the notch $o$ of a finger $p$, that projects inwardly from the head beyond its shoulder $l$. Finger $p$, as it fits over said shoulder by reason of said notch, permits the rotation of the inner member, but not its longitudinal displacement, unless said finger is caused to register with notch $q$ in bead $m$, when the inner member may be withdrawn. The wide strip $j$ which forms the gate, has at one side of its outer wall a longitudinal depression $r$, constituting a measuring pocket, the bottom of said depression or pocket being at its outer edge $s$, set somewhat below the said outer wall, to provide a narrow space between said edge $s$ and the wall of chamber $a'$, to permit the tooth-powder to enter the said pocket, when the inner member is rotated in the direction indicated by the arrow. When so rotated, the pocket measures out and brings up to the mouth $c$, just enough powder for the brush, the latter being either pressed down to the mouth $c$, or the box being turned over upon the brush. It will be observed that when the box is held mouth up, the powder will settle to the lower side of the chamber $a$, and as the latter is in communication with measuring pocket $r$, the proper turning of the inner member will cause the pocket to catch a supply of powder.

The modification illustrated in Figs. 6, 7, and 8, has no pocket, and is otherwise slightly dissimilar to the preferred form of my invention. Similar parts bear similar reference letters to the main form, and need not be described except incidentally.

The outer member $a$ has both ends open, and the inner member $b$ projects beyond both ends. The head of the inner member has a milled bead $t$ for affording a hand-grasp, and unlike the main form there is no similar means for preventing longitudinal displacement. The end opposite the head $i$, has a flange or annular shoulder $u$, which abuts against the contiguous end of the outer member, and, with said head, retains the parts in position.

Instead of the outer member containing the powder, as in the main form, the inner member contains it, said inner member having a cylindrical body $v$, fitting snugly within the outer member, and provided with a longitudinal elongated slot $w$, corresponding to and adapted to register with the mouth $c$. An oscillating movement, only, is permitted the inner member $b$, because of its projection or lug $x$, which has limited movement in the transverse recess $y$, formed in the outer member. The portion of the body $v$, at $z$, forms in this instance the gate or cut-off and when turned across the mouth $c$, prevents the spilling of the contents of the box. In this form of my invention the brush is held to the mouth $c$, and that, registering with the slot $w$, permits a supply of powder to be furnished the brush when the box is turned bottom upward.

The modification illustrates but one change from the preferred form, but I desire it understood that I deem it my privilege to make all changes in the construction as properly fall within the scope and spirit of my invention. I am aware, however, that a box having an inner and an outer member, in which an opening in the outer member is closed by the rotation of the inner member which acts as a gate or cut-off, is old, and I do not claim that construction broadly.

Having fully described my invention, what I claim is—

1. A box for tooth-powder, comprising an outer member constructed with a narrow elongated opening, and provided with a funnel-shaped fender or guide surrounding said opening, and an inner member located within the outer member in which it is movable, and forming a gate or cut-off for the opening thereof, substantially as described.

2. A box for tooth-powder, comprising an outer member constructed with a narrow elongated opening and provided with an outwardly projecting funnel-shaped fender or guide which surrounds the said opening, and an inner member located within the outer member in which it is movable and forming a gate or cut-off for the opening thereof, substantially as described.

3. A box for tooth-powder, comprising an outer member constructed with an opening and provided with a funnel-shaped guide or fender surrounding the same, and an inner member located within the outer member in which it is movable to open and close the opening thereof and constructed with a measuring-pocket which it presents to the said opening, substantially as described.

4. A box for tooth-powder, comprising a cylindrical outer member having an opening, and a funnel-shaped fender or guide surrounding the same, and an inner member fitting closely within the outer member and rotatable therein, and forming a gate or cut-off for the opening thereof, substantially as described.

5. A box for tooth-powder, comprising a cylindrical outer member constructed with a narrow elongated opening, and with a projecting funnel-shaped fender or guide surrounding the same, and an inner member fitting closely within the outer member, and rotatable therein, forming a gate for opening and closing the said opening, and constructed with a measuring-pocket, substantially as described.

6. A box for tooth-powder, comprising a cylindrical outer member constructed with a long narrow opening forming a mouth, and provided with an outwardly projecting funnel-shaped fender or guide surrounding the said mouth, and furnished at its open end with an annular bead, of an inner member fitting closely within the outer member in which it is rotatable, and constructed to form a gate for opening and closing the opening thereof, and furnished at its outer end with a finger adapted to engage the said bead for holding the two members together, substantially as described.

In testimony whereof I have signed this specification in the presence of two subscribing witnesses.

WARREN A. SPALDING.

Witnesses:
  GEO. D. SEYMOUR,
  FRED C. EARLE.